United States Patent Office 2,893,827
Patented July 7, 1959

2,893,827

SEPARATION OF AMERICIUM FROM PROMETHIUM

Roscoe E. Pressly, Loudon, Tenn., assignor to the United States of America as represented by the United States Atomic Energy Commission No Drawing. Application March 27, 1958
Serial No. 724,485

3 Claims. (Cl. 23—14.5)

My invention relates to the recovery of promethium from an aqueous fission-product solution and more particularly to the separation of promethium from americium.

Promethium 147, a radioactive rare-earth nuclide produced by fission of uranium or plutonium, is useful as a source of beta radiation. The 0.226 million electron volt energy of the promethium beta particle renders promethium particularly suitable for use in the preparation of phosphors. In addition promethium may be employed as a source of beta radiation for the production of X rays by the bombardment of such metals as platinum and tantalum. These radiation-source applications require high-purity promethium uncontaminated by other radioactive elements.

The usual source material for promethium 147 is an aqueous radioactive solution obtained in the chemical processing of irradiated nuclear reactor fuel by means of solvent extraction with an organic extractant. Such processes generally comprise contacting an acidic aqueous solution of neutron-irradiated uranium with a selective organic extractant, such as tributyl phosphate in a hydrocarbon diluent. The uranium is selectively extracted into the organic phase while the fission products remain in the aqueous phase. Further details of various solvent extraction processes for irradiated nuclear reactor fuels are available in a report entitled "Symposium on the Reprocessing of Irradiated Fuels Held at Brussels, Belgium, May 20-25, 1957," Book 1, TID-7534. The aqueous solutions resulting from these processes contain fission products, actinide nuclear transmutation elements such as plutonium and americium, and varying quantities of other materials such as stainless steel corrosion products. Radioactive fission products are in general recovered from such aqueous solutions in two types of processes, depending on the radioactive decay times of the fission products involved. Fission products having relatively short half-lives are recovered by processing the aqueous fission product solution without allowing the solution to decay for an extended period of time. In the case of long-lived radioactive fission products, i.e., those with half-lives over approximately 240 days, the aqueous fission product solution is allowed to decay for a period of approximately two to four years before further processing. Promethium 147, having a relatively long half-life of 2.6 years, is preferably recovered by processing a solution of long-lived fission products after a decay period of at least two years. Processes for recovering both short-lived and long-lived fission products are described in a report entitled "Production of Rare-Earth Fission Isotopes" by R. S. Pressly, ORNL 2252, issued May 24, 1957, and available from the Office of Technical Services.

After a two-year decay period an aqueous fission product solution resulting from processing nuclear reactor fuel contains approximately equal activities of promethium 147 and cesium 137, along with lesser activities of other radioactive rare-earths, such as cerium 144, europium 155, yttrium 91 and samarium 151 and a substantial activity of americium 241. Other constituents of the solution are non-radioactive rare earths such as neodymium, resulting from the decay of short-lived radioactive fission products, and a minor proportion of the actinide elements plutonium and curium. The cesium 137 may be readily removed from the solution by means of a cesium recovery process which comprises precipitating ammonium alum in the solution and separating the cesium from the precipitate. This process is described in a co-pending application by S. J. Rimshaw entitled "Separation of Cesium 137," S.N. 551,186, filed December 5, 1955.

In order to obtain promethium 147 from the aqueous solution remaining after the removal of cesium 137, the solution is subjected to further precipitation and ion-exchange steps by means of which substantially all of the rare earths other than promethium are removed. Cerium is removed by iodate precipitation, with the tetravalent iodate being precipitated by the addition of $HIO_3$ and an oxidizing agent such as $NaBrO_3$. Traces of plutonium and a minor proportion of the americium contained in the solution are also removed with the iodate precipitate. The remaining rare-earths are removed form the solution by contacting the solution with an amine-type anion exchange resin, such as the resins available commercially under the trade names "Nalcite HCR" and "Dowex 50."

The processing described above serves to separate substantially all of the other rare earths, both radioactive and non-radioactive, and extraneous impurities such as corrosion products from the promethium. However, the resulting promethium product solution still contains a substantial amount of americium 241 activity. The alpha and gamma radiations emitted by americium 241 interfere with promethium beta radiation thus rendering promethium unsuitable for radiation-source applications. The alpha radiation level of such an americium-contaminated solution is generally on the order of 50,000 alpha counts per minute per millicurie of promethium. For radiation-source applications the desired maximum alpha radiation level is approximately 200 alpha counts per minute per millicurie of promethium.

Americium has previously been separated from promethium by means of ion-exchange adsorption and selective elution. This method, however, is applicable only to the preparation of relatively small amounts of promethium. A relatively long processing time is required, and the high level of radioactivity is excessively damaging to the ion-exchange resins employed.

The americium which is sought to be separated from the product promethium is a valuable by-product, being useful for experimental purposes. Accordingly, it is desirable to recover the separated americium as well as the promethium.

It is, therefore, an object of my invention to provide a method of recovering promethium from an aqueous solution of fission products.

Another object is to provide a method of recovering relatively large quantities of promethium, substantially free of radioactive contaminants, from an aqueous solution of fission products.

Another object is to provide a method of separating americium from promethium.

Another object is to provide a method of separately recovering americium and promethium from an aqueous solution containing the same.

Other objects and advantages of my invention will be apparent from the following detailed description.

In accordance with my invention promethium may be separated from an acidic aqueous solution containing the same together with americium by adding fluosilicic acid to said solution, heating the resulting solution until the formation of a promethium fluoride precipitate results and separating the resulting promethium-enriched precipitate from the resulting americium-enriched supernatant liquid. For substantially complete separation the precipitate is subjected to additional precipitation cycles, preferably at least six in number. This method is substantially more rapid and more easily controlled than the previously employed ion-exchange separation method. This method is also suitable for the economical preparation of relatively large quantities of high-purity promethium.

Although the exact composition of the acidified feed solution containing americium and promethium is not critical to my invention, in order to obtain a high purity product it is preferred to employ a solution from which substantially all other radioactive materials have been removed, for example, the solution remaining after the removal of other long-lived fission products as described above. In addition, it is preferred that the solution be substantially free of other, non-radioactive contaminants. Although the acid content of the feed solution may be in the form of any mineral acid such as sulfuric, hydrochloric or nitric acids, nitric acid is preferred. The concentration of acid in the solution is not critical. In the case of nitric acid a concentration in the range of approximately 0.5 N to 8.0 N may be employed, and similar concentrations are suitable for the other mineral acids. It is preferred to employ a relatively low mineral acid concentration, e.g., within the range of approximately 1.0 N to 2.0 N in the case of nitric acid, in view of the better product separation obtained at low concentrations. The reaction with fluosilicic acid takes place more rapidly at higher concentrations, but the resulting promethium fluoride precipitate separates from the solution less effectively.

Fluosilicic acid is added to the acidified feed solution in order to precipitate promethium in the form of promethium fluoride. Americium is more strongly complexed by the fluosilicic acid and tends to stay in solution. For effective precipitation an amount of fluosilicic acid sufficient to result in a fluosilicic acid concentration within the range of approximately 2.5 M to 3.5 M is required, and a resulting concentration within the range of 3.0 M to 3.3 M is preferred. In order to obtain a more rapid precipitation reaction the solution is gradually heated to boiling and boiled slowly for approximately twenty minutes. This boiling also serves to decompose unreacted fluosilicic acid to hydrofluoric acid and silicon fluoride, both of which are removed from the boiling solution by volatilization.

The resulting promethium fluoride precipitate settles in the solution and may readily be removed by conventional means such as centrifugation, filtration or decantation. For further separation from impurities, the precipitate is washed with distilled water. Approximately 15 percent of the original americium alpha activity is removed from the promethium by this precipitation procedure.

In order to obtain substantially complete removal of americium, it is preferred to subject the promethium fluoride precipitate to a plurality of dissolution-precipitation cycles. In each cycle the promethium fluoride precipitate is re-dissolved in nitric acid and re-precipitated with fluosilicic acid. The precipitate may readily be dissolved in nitric acid by the addition of boric acid to form a soluble boric acid-fluoride complex, leaving the promethium soluble in nitric acid. For effective complexing boric acid is added to the precipitate and the resulting mixture is agitated while being heated to approximately 80° C. Concentrated nitric acid is then added and the mixture is heated at its boiling temperature until the precipitate is dissolved. Although the concentrations of boric acid and nitric acid are not critical, it is preferred to dissolve the precipitate by the use of one volume of a saturated boric acid solution, i.e., 8 M and one volume of 16 N nitric acid. Upon dissolution of the precipitate, a small amount of silicon dioxide may form in the solution and precipitate out. This silicon dioxide precipitate may be removed by any conventional means such as centrifugation or filtration. The resulting concentrated nitric acid product solution is then diluted to the starting acid concentration, i.e., 1.0 N to 8.0 N, and fluosilicic acid is added as before to re-precipitate promethium fluoride. The precipitate is separated and recovered to complete the cycle. An americium decontamination factor of approximately 3.7 is obtained for each cycle, and it is preferred to employ a series of at least six cycles to remove substantially all of the americium.

More complete recovery of promethium may be obtained in the final product precipitation step by means of the addition of hydrofluoric acid to the product solution in addition to the fluosilicic acid. Although the HF concentration is not critical, it is preferred to add an amount sufficient to result in a concentration of 2.5 N to 3.5 N in the resulting solution. Promethium is recovered from the final precipitate in the form of promethium fluoride.

A small amount of promethium remains in the supernatant liquid during each precipitation step. Where numerous cycles are employed, the supernatant liquid from the initial cycles contains a relatively high ratio of americium to promethium and is thus amenable to americium recovery. The supernatant liquid from later cycles contains a high ratio of promethium of americium and is suitable to be recycled and re-precipitated with fluosilicic acid.

Americium may be recovered from the americium-enriched supernatant liquid by means of heating the solution to decompose the americium-fluosilicic acid complex and adding hydrofluoric acid to form an americium fluoride precipitate. The complex is decomposed by boiling the solution for approximately twenty minutes. Americium is recovered from the precipitate in the form of americium fluoride.

My invention is further illustrated by the following specific example.

EXAMPLE

Approximately 100 milliliters of an aqueous solution resulting from the processing of an aged, solution of neutron-irradiated uranium to remove untransformed uranium, plutonium, and the bulk of the long-lived fission products was subjected to eight precipitation cycles, as described below, in order to separate the americium and promethium contained in the solution. The solution had a nitric acid concentration of 8.0 N and a promethium beta activity level of 0.5 curie per milliliter. The solution was substantially free of impurities and radioactive material other than promethium and americium. The promethium-beta to americium-alpha radiation ratio of the solution was $3.7 \times 10^4$, this being equivalent to approximately 50,000 alpha counts per minute per millicurie of promethium. Fluosilicic acid was added to the solution until the resulting solution had a fluosilicic acid concentration of 3.0 M to 3.3 M. The resulting solution was heated gradually to boiling and boiled slowly for twenty minutes. The fluosilicic acid decomposed to form hydrofluoric acid and silicon fluoride, both of which were removed from the solution by volatilization. A precipitate of promethium fluoride formed and settled to the bottom of the solution. The precipitate was recovered by centrifugation and washed with 50 ml. of distilled water. 50 ml. of a saturated boric acid solution was then added to the precipitate, and the resulting slurry was agitated and heated slowly to 80° C. 50 ml. of 16 N nitric acid was then added, and the mixture was heated to boiling to dissolve the precipitate. A slight amount of silicon dioxide precipitated and was removed from the solution by centrifugation. The solution was then reduced in volume to 100 ml. by boiling. Promethium fluoride was re-precipitated, and the precipitate was re-dissolved for a total of eight cycles. The precipitate resulting from the eighth cycle was then recovered. The alpha and beta radiation levels of the starting solution, the supernatant liquid from each cycle and the final promethium product were measured by means of conventional instruments. The amount of americium and promethium in the precipitate for each cycle was calculated by subtracting the measured amount of each lost into the supernatant in each cycle from the original total amounts. The results obtained are listed in Table I.

*Table I*

SEPARATION OF PROMETHIUM AND AMERICIUM

|  | Americium content (total alpha counts per min.) | Americium removed in supernatant from each cycle | | Promethium (beta millicuries) | Promethium content in supernatant from each cycle | | Amount of original Americium and Promethium contained in the precipitate from each cycle (percent) | |
|---|---|---|---|---|---|---|---|---|
|  |  | Alpha counts per minute | Percent of original alpha |  | Total beta millicuries | Percent of original beta | Americium | Promethium |
| Starting Solution | 3.03×10⁹ |  |  | 59,700 |  |  |  |  |
| Cycle 1 |  | 4.1×10⁸ | 14 |  | 258 | 0.4 | 86 | 99.6 |
| Cycle 2 |  | 1.7×10⁹ | 56 |  | 2,252 | 4.3 | 30 | 95.2 |
| Cycle 3 |  | 6.5×10⁸ | 20 |  | 2,100 | 3.5 | 10 | 91.7 |
| Cycle 4 |  | 1.5×10⁷ | 0.5 |  | 823 | 1.4 | 9 | 90.3 |
| Cycle 5 |  | 1.6×10⁸ | 5.2 |  | 1,799 | 3.0 | 4 | 87.3 |
| Cycle 6 |  | 1.3×10⁸ | 4.3 |  | 5,161 | 8.6 | 3 | 80.7 |
| Cycle 7 |  | 4.6×10⁷ | 0.2 |  | 4,111 | 6.8 | 2 | 73.9 |
| Cycle 8 |  | 1.5×10⁷ | 0.05 |  | 3,800 | 6.4 | 0.003 | 67.5 |
| Promethium Fluoride Product | 7.7×10⁶ |  | 0.003 | 32,900 |  | 55 |  |  |

It may be seen from Table I that the alpha radiation level was reduced to 0.003 percent of its original level by the eight precipitation cycles. The bulk of the alpha activity was removed in the first three cycles, with 14% being removed in the first cycle, an additional 56% being removed in the second cycle and 20% in the third cycle. The number of alpha counts per minute per millicurie of promethium was reduced from 50,000 to 234. The actual recovery of promethium was 55%, leaving 12½% unrecovered losses to the silicon dioxide precipitate and the surfaces of the apparatus employed.

It is to be understood that the above example is merely illustrative and is not to be construed as limiting the scope of my invention, which is limited only as indicated by the appended claims. It is also to be understood that many variations in procedures and apparatus may be employed within the scope of my invention.

Having thus described my invention, I claim:

1. The method of separating promethium from americium which comprises contacting an acidic aqueous solution containing promethium and americium with a solution of fluosilicic acid, heating the resulting mixture until the formation of a promethium fluoride precipitate results, separating said promethium fluoride precipitate from the resulting supernatant liquid, effecting a dissolution-precipitation cycle comprising dissolving the promethium fluoride resulting from the preceding precipitation in a solution of boric acid and concentrated nitric acid, contacting the resulting solution with a solution of fluosilicic acid, heating the resulting mixture until the formation of a promethium fluoride precipitate results and separating said promethium fluoride precipitate from the resulting supernatant liquid, repeating said dissolution-precipitation cycle a plurality of times, and recovering the promethium fluoride precipitate resulting from the final cycle.

2. The method of separately recovering promethium from an acidic aqueous solution containing promethium and americium which comprises adding fluosilicic acid to said solution until the fluosilicic acid concentration of the resulting mixture is within the range of approximately 2.5 M to 3.5 M, heating said resulting mixture until the formation of a promethium fluoride precipitate results, separating said precipitate from the resulting supernatant liquid, effecting a dissolution-precipitation cycle comprising dissolving the precipitate resulting from the preceding precipitation in a solution of boric acid and concentrated nitric acid and adding fluosilicic acid to the resulting solution until the fluosilicic acid concentration of the resulting solution is within the range of approximately 2.5 M to 3.5 M, heating the resulting solution until the formation of a promethium fluoride precipitate results and separating the resulting promethium fluoride precipitate from the resulting supernatant liquid, repeating said dissolution-precipitation at least six times, recovering said promethium fluoride precipitate resulting from the final cycle and recovering americium from said supernatant liquids.

3. The method of claim 2 in which the initial acidic aqueous solution containing promethium and americium is a nitric acid solution.

References Cited in the file of this patent

Seaborg et al.: "The Transuranium Elements," Part II, pp. 1344–1346 (1949), McGraw-Hill Book Co., Inc., N.Y.C.

Pressly: "ORNL-2252," pp. 1–12, May 27, 1957.